United States Patent
Wang et al.

(10) Patent No.: US 10,951,580 B2
(45) Date of Patent: Mar. 16, 2021

(54) COMMUNICATION SYSTEM ARCHITECTURE AND METHOD OF PROCESSING DATA THEREIN

(71) Applicant: Purdue Research Foundation, West Lafayette, IN (US)

(72) Inventors: He Wang, West Lafayette, IN (US); Siyuan Cao, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 501 days.

(21) Appl. No.: 15/971,759

(22) Filed: May 4, 2018

(65) Prior Publication Data

US 2018/0324141 A1    Nov. 8, 2018

Related U.S. Application Data

(60) Provisional application No. 62/501,287, filed on May 4, 2017.

(51) Int. Cl.
| | |
|---|---|
| *G06F 15/16* | (2006.01) |
| *H04L 29/12* | (2006.01) |
| *G06T 7/292* | (2017.01) |
| *H04L 12/743* | (2013.01) |
| *G06T 7/246* | (2017.01) |
| *H04W 12/10* | (2021.01) |

(Continued)

(52) U.S. Cl.
CPC .......... *H04L 61/2503* (2013.01); *G06T 7/246* (2017.01); *G06T 7/292* (2017.01); *H04L 45/7453* (2013.01); *H04W 4/029* (2018.02); *H04W 12/00508* (2019.01); *H04W 12/1008* (2019.01); *H04L 61/609* (2013.01)

(58) Field of Classification Search
CPC . H04L 45/7453; H04L 61/2503; H04L 67/12; H04L 67/18; G06T 7/292; G06T 7/246; H04W 4/029
See application file for complete search history.

(56) References Cited

U.S. PATENT DOCUMENTS

| | | | |
|---|---|---|---|
| 2012/0274781 A1* | 11/2012 | Shet | G06K 9/6857 348/169 |
| 2016/0125616 A1* | 5/2016 | Lee | G06T 7/254 382/205 |

(Continued)

*Primary Examiner* — Oleg Survillo
(74) *Attorney, Agent, or Firm* — Purdue Research Foundation

(57) ABSTRACT

A method includes identifying a plurality of local tracklets from a plurality of targets, creating a plurality of global tracklets from the plurality of local tracklets, wherein each global tracklet comprises a set of local tracklet of the plurality of local tracklets, wherein the set of local tracklet corresponds to a target of the plurality of targets; extracting motion features of the target from the each global tracklet of the plurality of global tracklets, wherein the motion features of each target of the plurality of targets from each global tracklet of the plurality of global tracklets are distinguishable from the motion features of remaining targets of the plurality of targets from remaining global tracklets; transforming the motion features into an address code by using a hashing process; and transmitting a plurality of address codes and a transformation parameter of the hashing process to a communication device.

21 Claims, 3 Drawing Sheets

(51) Int. Cl.
*H04W 4/029* (2018.01)
*H04W 12/00* (2021.01)

(56) References Cited

U.S. PATENT DOCUMENTS

2017/0240066 A1\* 8/2017 Wang ..................... B60R 22/48
2018/0218203 A1\* 8/2018 Lawson ................... G06T 7/20

\* cited by examiner

COMMUNICATION SYSTEM ARCHITECTURE AND METHOD OF PROCESSING DATA THEREIN

CROSS-REFERENCE TO RELATED APPLICATIONS

The present U.S. patent application is related to and claims the priority benefit of U.S. Provisional Patent Application Ser. No. 62/501,287, filed May 4, 2017, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

Conventional communication systems often require a setup where a master server needs information idiosyncratic to a client device for the purposes of effectuating communication and sending messages. Information idiosyncratic to the client device include client destination address, IP address, etc. Such conventional communication systems insinuate privacy issues with holders of respective client devices since the associated master servers often have the tendency to identify and store information idiosyncratic to such client devices.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 1 is a flow-chart which illustrates a first method of processing data according to one or more embodiments.

FIG. 2 is a flow-chart which illustrates a second method of processing data according to one or more embodiments.

SUMMARY

Figure 3:
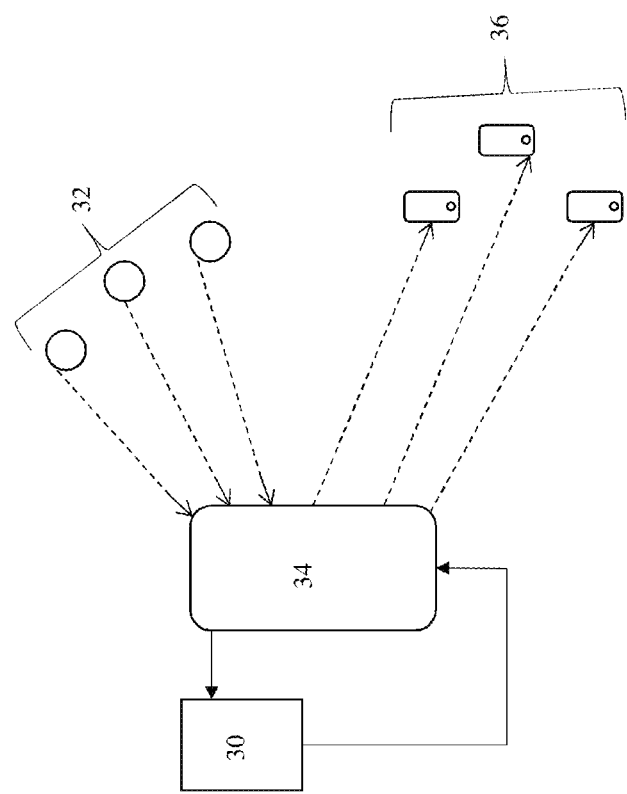
FIG. 3 is a communication system architecture according to one or more embodiments.

One aspect of the present application relates to a method includes identifying a plurality of local tracklets from a plurality of targets, creating a plurality of global tracklets from the plurality of local tracklets, wherein each global tracklet comprises a set of local tracklet of the plurality of local tracklets, wherein the set of local tracklet corresponds to a target of the plurality of targets; extracting motion features of the target from the each global tracklet of the plurality of global tracklets, wherein the motion features of each target of the plurality of targets from each global tracklet of the plurality of global tracklets are distinguishable from the motion features of remaining targets of the plurality of targets from remaining global tracklets; transforming the motion features into an address code by using a hashing process; and transmitting a plurality of address codes and a transformation parameter of the hashing process to a communication device.

Another aspect of the present application relates to a method including receiving a plurality of address codes, a hash process, and a transformation parameter of the hash process from a server. The method additionally includes extracting motion features of a user, wherein the user is in physical possession of the second processor. Additionally, the method includes transforming the motion features into a second address code by using the hash process. Furthermore, the method includes validating the second address code with a validating address code of the plurality of address codes. Moreover, the method includes receiving a message from the server, wherein the message is concocted with the validating address code of the plurality of address codes.

Still another aspect of the present application relates to a method including identifying, using a server, a plurality of local tracklets from a plurality of targets. Additionally, the method includes creating, using a server, a plurality of global tracklets from the plurality of local tracklets, wherein each global tracklet includes a set of local tracklet of the plurality of local tracklets, wherein the set of local tracklet corresponds to a target of the plurality of targets. Furthermore, the method includes extracting, using a server, motion features of the each global tracklet of the plurality of global tracklets, wherein the motion features of the each global tracklet are independent to remaining global tracklets of the plurality of global tracklets. Moreover, the method includes transforming, using a server, the motion features into an address code by using a hash process. Additionally, the method includes transmitting, using a server, a plurality of address codes and the transformation parameter of the hash process to a communication device. Further, the method includes receiving, by a communication device, the plurality of address codes, the hash process, and the transformation parameter from the server. Moreover, the method includes extracting a second motion features of the communication device. Additionally, the method includes transforming the second motion features of the communication device into a second address code using the hash process. Moreover, the method includes validating the second address code with a validating address code of the plurality of address codes. Next, the method includes receiving a message from the server, wherein the message is concocted with the validating address code of the plurality of address codes.

DETAILED DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present application relate to a method of communication between a master server and associated clients. Such method of communication validates client device identity based on motion features identified by at least one camera that is connected to the master server.

After such validation, the client device is able to realize a message from the master server.

FIG. 1 is a flow-chart which illustrates a method 100 of executing a processing method by a processor. Method 100 begins with step 105 where a plurality of local tracklets are identified from a plurality of targets. Method 100 continues with step 110 where a plurality of global tracklets are created from the plurality of local tracklets. Method 100 further continues with step 115 where motion features of at least one target are extracted from each global tracklet of the plurality of global tracklets. Method 100 then continues with step 120 where the motion features are transformed into an address code by using a hashing process. Method 100 further includes step 125 where a plurality of address codes and a transformation parameter of the hashing process are transmitted to a communication device. In one or more embodiments, method 100 is performed in real time.

Step 105 includes identifying the plurality of local tracklets from the plurality of targets. In at least one embodiments, the plurality of targets are multiple people at a venue that are in physical possession of a communication device. In some embodiments, the communication device includes at least one of a cell phone, a smart phone, a tablet, or any device capable of communicating with external servers. In one or more embodiments, multiple cameras at a venue identify the plurality of tracklets of each target. In some embodiments, a single camera at a venue identifies the plurality of tracklets of each target. According to some embodiments, step 105 includes identifying a plurality of local tracklets from a single target. The plurality of local tracklets are stored onto a master server.

Step 110 includes creating a plurality of global tracklets from the plurality of local tracklets. Each global tracklet of the plurality of global tracklets contains a set of local tracklet belonging to a single target. Creating each global tracklet categorizes a set of local tracklet belonging to each target. Each of the above categories which contain tracklet information about a target is then parsed for further processing by the master server. Multiple tracklets from the set of local tracklet are stitched together in at least one of a. spatial space; or b. temporal space. In some embodiments, step 110 includes creating a single global tracklet.

Step 115 includes extracting motion features from each global tracklet of the plurality of global tracklets. The motion features include at least one of movement, absolute direction, or relative direction. In one or more embodiments, the motion features include a vector, wherein the vector includes a movement vector, an absolute direction vector, or a relative direction vector. The motion features from each global tracklet (of each target) are distinguishable from the motion features of remaining global tracklets (of remaining targets). In some embodiments, step 115 includes extracting the motion features from a single global tracklet. An entirety of the each global tracklet includes the motion features of a single target.

Step 120 includes transforming the motion features of each global tracklet into an address code by using a hashing process. In at least one embodiment, step 120 includes transforming the motion features of the each global tracklet into the address code by using principal component analysis. In at least one embodiment, the transforming the motion features of the each global tracklet into the address code by using principal component analysis includes transforming a first motion feature of the motion features of the each global tracklet (of a single target) into a first motion code by using the principal component analysis.

Step 120 further includes transforming a second motion feature of the motion features of the each global tracklet (of the single target) into a second motion code by using the principal component analysis. Step 120 includes an optional step $120_1$ which includes transforming a third motion feature of the motion features of the each global target (of the single target) into a third motion code by using the principal component analysis. A plurality of motion codes, which include the first motion code and the second motion code, are stitched into the address code. In at least one embodiment, the first motion code and the second motion code refer to different motion feature categories. In conjunction with step $120_1$, the first motion code, the second motion code, and the third motion code are stitched into the address code, where the first motion code, the second motion code, and the third motion code refer to different motion feature categories.

Step 120 includes an optional step 120a which relates to transforming a particular motion feature of the motion features into a motion code. Step 120a includes adding multiple noise vectors to each vector of a set of vectors, thereby generating a concatenated set of vectors. The each vector of the set of vectors includes information on a category of the particular motion feature. Step 120a then proceeds with applying the principal component analysis to the concatenated set of vectors to calculate a transformation coefficient matrix. Furthermore, Step 120a includes using a specified vector which includes information about the particular motion feature, along with the transformation coefficient matrix, to calculate the motion code. The motion feature categories include a movement vector category, an absolute direction vector category, and a relative direction vector category. In one or more embodiments, a user selects a number of principal components for the principal component analysis.

Step 125 includes transmitting a plurality of address codes and the transformation parameter of the hash process to the communication device. In one or more embodiments, the plurality of address codes precipitate from various motion feature. In some embodiments, each address code of the plurality of address codes is concocted with a message. In some embodiments, the hash process includes principal component analysis.

One of ordinary skill in the art would recognize that operations are added or removed from method 100, in one or more embodiments. One of ordinary skill in the art would also recognize that the order of the operations in method 100 is varied in various alternative embodiments.

FIG. 2 is a flow-chart which illustrates a method 200 of executing a second processing method by a processor. Method 200 begins with step 205 where a plurality of address codes, a hash process, and a transformation parameter of the hash process are received from a server by a communication device. In one or more embodiments, step 205 includes receiving the plurality of address codes (from method 100), the hash process (from method 100), and the transformation parameter of the hash process (from method 100) from the server (method 100).

Method 200 continues with step 210 where motion features of a user who is in physical possession of the processor are extracted. In one or more embodiments, a communication device includes the processor. In some embodiments, the communication device includes at least one of a cell phone, a smart phone, a tablet, or any device capable of communicating with external servers.

Method 200 continues with step 215 where the motion features of the user are transformed into a second address code by using a hash process. In at least one embodiment, step 215 includes transforming the motion features into an address code by using principal component analysis. In at least one embodiment, the transforming the motion features into the address code by using principal component analysis includes transforming a first motion feature of the motion features (of the user) into a first motion code by using the principal component analysis.

Step 215 further includes transforming a second motion feature of the motion features (of the user) into a second motion code by using the principal component analysis. Step 215 includes an optional step $215_1$ which includes transforming a third motion feature of the motion features (of the user) into a third motion code by using the principal component analysis. A plurality of motion codes, which include the first motion code and the second motion code, are then stitched into the address code. In at least one embodiment, the first motion code and the second motion code refer to different motion feature categories. In conjunction with step $215_1$, the first motion code, the second motion code, and the third motion code are stitched into the address code, where the first motion code, the second motion code, and the third motion code refer to different motion feature categories.

Step 215 includes an optional step 215a which relates to transforming a particular motion feature of the motion features into a motion code. Step 215a includes using a specified vector which includes information about the particular motion feature, along with the transformation coefficient matrix (which is received from method 100), to calculate the motion code. In some embodiments, the motion feature categories include a movement vector category, an absolute direction vector category, and a relative direction vector category.

Method 200 includes step 220 where the second address code is validated with a validating address code of the plurality of address codes. In one or more embodiments, step 220 includes comparing the second address code with the validating address code to ensure that the second address code is substantially equal to the validating address code. In at least one embodiment, the validating address code is transmitted from a master server. In various embodiments, the plurality of address codes from method 100 include the validating address code.

Method 200 additionally includes step 225 where a message is received from a server. In at least one embodiment, the message is concocted with the validating address code. In some embodiments, the server is the master server. In one or more embodiments, the message is concocted with the validating address code in the master server. In some embodiments, the message and the validating address code is received from the master server.

One of ordinary skill in the art would recognize that operations are added or removed from method 200, in one or more embodiments. One of ordinary skill in the art would also recognize that the order of the operations in method 200 is varied in various alternative embodiments. In one or more embodiments, method 200 is performed in real time.

FIG. 3 is a communication system architecture according to one or more embodiments. Communication interface 34 receives tracklet data from one or more cameras 32. The tracklet data is then communicated to server 30 via communication interface 34. A multitude of protocols at the server side are configured to perform a plurality of methods in method 100 by server 30. Communication device 34 then transmits processed data to one or more communication devices 36. A second multitude of protocols at the client side are configured to perform a plurality of methods in method 200 by the one or more communication devices 36. In one or more embodiments, the one or more communication devices 36 includes at least one of a cell phone, a smart phone, a tablet, or any device capable of communicating with external servers. The one or more communication devices 36 is carried by one or more targets in a venue.

Figure 4:
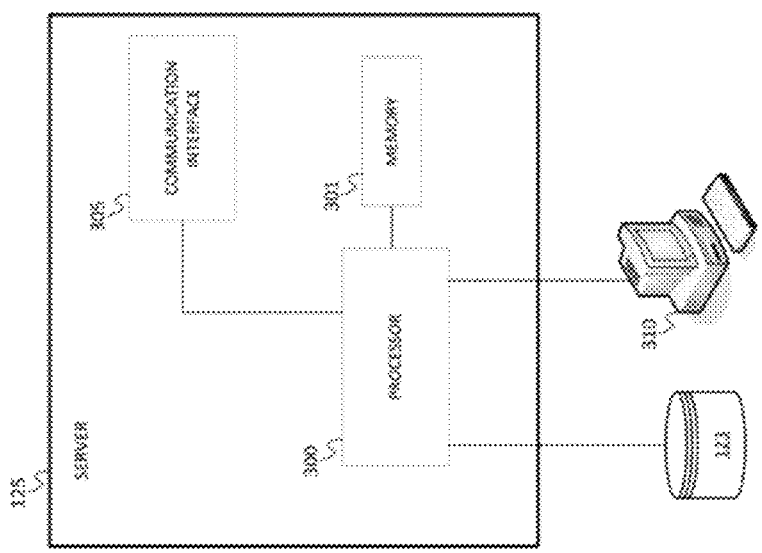
FIG. 4 illustrates an exemplary server associated with processes of FIGS. 1 and 2.

FIG. 4 illustrates an exemplary server 125 of method 100. The server 125 includes a processor 300, a communication interface 305, and a memory 301. The server 125 may be coupled to a database 123 and a workstation. The workstation may be used as an input device for the server 125. In addition, the communication interface 305 is an input and/or output device for the server 125. In some embodiments, the communication interface 305 is configured to receive the plurality of local tracklets (of one or more targets) from one or more cameras. The communication interface 305 receives data indicative of use inputs made via the workstation, cameras, the mobile device, or personal computer.

The controller and/or processor 300 may include a general processor, digital signal processor, an application specific integrated circuit (ASIC), field programmable gate array (FPGA), analog circuit, digital circuit, combinations thereof, or other now known or later developed processor. The controller and/or processor 300 may be a single device or combinations of devices, such as associated with a network, distributed processing, or cloud computing.

The controller and/or processor 300 may also be configured to cause an apparatus to at least perform at least one of the aerial image refining methods described above. For example, the controller and/or processor 300 may be configured to perform the process: (1) method 100; and (2) method 200.

The memory and/or memory 301 may be a volatile memory or a non-volatile memory. The memory and/or memory 301 may include one or more of a read only memory (ROM), random access memory (RAM), a flash memory, an electronic erasable program read only memory (EEPROM), or other type of memory. The memory and/or memory 301 may be removable from the mobile device, such as a secure digital (SD) memory card.

The communication interface and/or communication interface 305 may include any operable connection. An operable connection may be one in which signals, physical communications, and/or logical communications may be sent and/or received. An operable connection may include a physical interface, an electrical interface, and/or a data interface. The communication interface and/or communication interface 305 provides for wireless and/or wired communications in any now known or later developed format.

In the above described embodiments, the network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory computer-readable medium encoded with a computer-readable program which, when executed by a second processor, will cause a computer to execute a second processing method, the second processing method comprising:

receiving a plurality of address codes, a hash process, and a transformation parameter of the hash process from a server;

extracting motion features of a user, wherein the user is in physical possession of the second processor;

transforming the motion features into a second address code by using the hash process;

validating the second address code with a validating address code of the plurality of address codes; and receiving a message from the server, wherein the message is concocted with the validating address code of the plurality of address codes.

2. The method of claim 1, wherein the validating the second address code with the validating address code of the plurality of address codes comprises comparing the second address code with the validating address code to ensure that the second address code is substantially equal to the validating address code.

3. The method of claim 1, wherein the transforming the motion features into the second address code by using the hash process comprises transforming the motion features into the second address code by using the transformation parameter comprising:

transforming a first motion feature of the motion features into a first motion code by using the transformation parameters;

transforming a second motion feature of the motion features into a second motion code by using the transformation parameters; and stitching a plurality of motion codes into the second address code, wherein the plurality of motion codes comprises the first motion code and the second motion code.

4. The method of claim 1, wherein the motion features comprises at least one of movement, absolute direction, or relative direction.

5. A non-transitory computer-readable medium encoded with a computer-readable program which, when executed by a first processor, will cause a computer to execute an image processing method, the processing method comprising:

identifying a plurality of local tracklets from a plurality of targets;

creating a plurality of global tracklets from the plurality of local tracklets, wherein each global tracklet comprises a set of local tracklet of the plurality of local tracklets, wherein the set of local tracklet corresponds to a target of the plurality of targets;

extracting motion features of the target from the each global tracklet of the plurality of global tracklets, wherein the motion features of each target of the plurality of targets from each global tracklet of the plurality of global tracklets are distinguishable from the motion features of remaining targets of the plurality of targets from remaining global tracklets;

transforming the motion features into an address code by using a hashing process; and transmitting a plurality of address codes and a transformation parameter of the hashing process to a communication device.

6. The image processing method of claim 5, wherein the identifying the plurality of local tracklets from the plurality of targets comprises:

using multiple cameras to identify the plurality of local tracklets from the plurality of targets.

7. The image processing method of claim 5, wherein the creating the plurality of global tracklets from the plurality of local tracklets comprises:

stitching multiple local tracklets of the plurality of local tracklets from multiple cameras.

8. The image processing method of claim 7, wherein the stitching the multiple local tracklets of the plurality of local tracklets from the multiple cameras comprises:
  stitching the multiple local tracklets of the plurality of local tracklets from the multiple cameras in spatial space and temporal space.

9. The image processing method of claim 5, wherein the extracting the motion features of the target comprises the motion features comprising at least one of a movement vector, an absolute direction vector, or a relative direction vector.

10. The image processing method of claim 5, wherein each motion feature of the motion features comprises a vector, wherein the vector comprises information on a category of motion feature.

11. The image processing method of claim 5, wherein the transforming the motion features into the address code by using the hashing process comprises transforming the motion features into the address code by using principal component analysis.

12. The image processing method of claim 5, wherein the transmitting the plurality of address codes and the transformation parameter to the communication device comprises:
  transmitting each address code of the plurality of address codes, wherein the each address code is concocted with a message.

13. The image processing method of claim 11, wherein the transforming the motion features into the address code by using the principal component analysis comprises:
  transforming a first motion feature of the motion features of the target into a first motion code by using the principal component analysis, wherein the first motion feature is a first category of motion feature;
  transforming a second motion feature of the motion features of the target into a second motion code by using the principal component analysis, wherein the second motion feature is a second category of motion feature; and
  stitching a plurality of motion codes into the address code, wherein the plurality of motion codes comprise the first motion code and the second motion code.

14. The image processing method of claim 13, wherein the transforming the first motion feature of the motion features of the target into the first motion code comprises:
  adding multiple noise vectors to each vector of a set of vectors, thereby generating a first concatenated set of vectors, wherein the each of the set of vectors comprises information on the first category of motion feature of the plurality of targets;
  applying the principal component analysis to the first concatenated set of vectors to calculate a transformation coefficient matrix; and
  using the transformation coefficient matrix and a first vector to calculate the first motion code, wherein the first vector comprises information of the first motion feature.

15. The image processing method of claim 13, wherein the first category of motion feature comprises a movement vector category, an absolute direction vector category, or a relative direction vector category.

16. The image processing method of claim 13, wherein the second category of motion feature comprises a movement vector category, an absolute direction vector category, or a relative direction vector category.

17. The image processing method of claim 14, further comprising selecting, by a user, a number of principal components for the principal component analysis.

18. The image processing method of claim 1, wherein an entirety of the each global tracklet comprises the motion features of a single target.

19. A method comprising:
  identifying, using a server, a plurality of local tracklets from a plurality of targets;
  creating, using a server, a plurality of global tracklets from the plurality of local tracklets, wherein each global tracklet comprises a set of local tracklet of the plurality of local tracklets, wherein the set of local tracklet corresponds to a target of the plurality of targets;
  extracting, using a server, motion features of the each global tracklet of the plurality of global tracklets, wherein the motion features of the each global tracklet are independent to remaining global tracklets of the plurality of global tracklets;
  transforming, using a server, the motion features into an address code by using a hash process;
  transmitting, using a server, a plurality of address codes and the transformation parameter of the hash process to a communication device;
  receiving, by a communication device, the plurality of address codes, the hash process, and the transformation parameter from the server;
  extracting a second motion features of the communication device;
  transforming the second motion features of the communication device into a second address code using the hash process;
  validating the second address code with a validating address code of the plurality of address codes; and
  receiving a message from the server, wherein the message is concocted with the validating address code of the plurality of address codes.

20. The method of claim 19, wherein the validating the second address code with the validating address code of the plurality of address codes comprises comparing the second address code with the validating address code to ensure that the second address code is substantially equal to the validating address code.

21. The method of claim 19, wherein the transmitting, using the server, the plurality of address codes and the transformation parameter to the communication device comprises:
  transmitting each address code of the plurality of address codes, wherein the each address code is concocted with a message.

* * * * *